March 6, 1956     R. LUCIEN     2,737,550
SELF-REGULATING BRAKES FOR AEROPLANE WHEELS AND THE LIKE
Filed Aug. 13, 1952
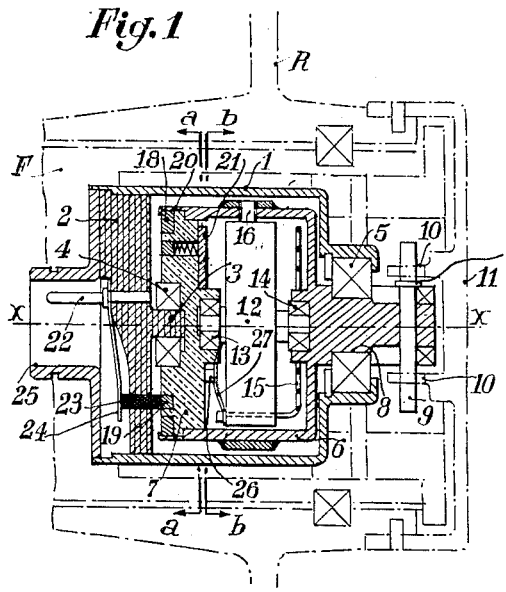
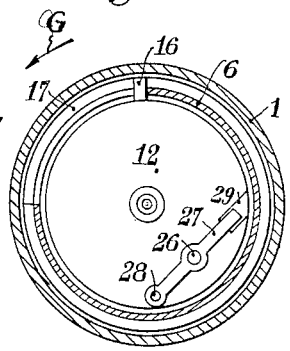
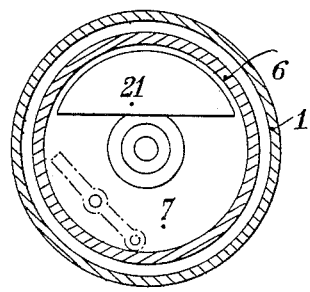
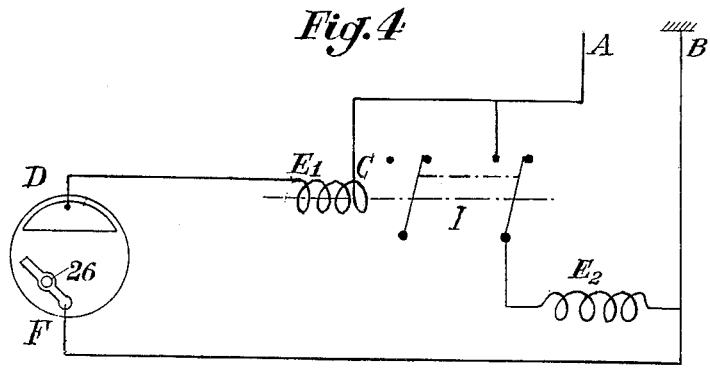
INVENTOR
RENE LUCIEN
By:
Hazeltine, Lake & Co.
AGENTS United States Patent Office 2,737,550
Patented Mar. 6, 1956

2,737,550

SELF-REGULATING BRAKES FOR AEROPLANE WHEELS AND THE LIKE

René Lucien, Paris, France, assignor to Societe d'Inventions Aeronautiques et Mecaniques S. I. A. M., Fribourg, Switzerland, a corporation of Switzerland Application August 13, 1952, Serial No. 304,074

Claims priority, application France May 10, 1952

1 Claim. (Cl. 200—61.46)

The present invention relates to a self-regulating brake controller for wheels, particularly of aeroplanes, the object of which, like those described in the copending patent application, Serial No. 255,268 in the name of the applicant is to prevent the wheels from skidding when they are braked or at least to reduce the duration and effects of this skidding.

It will be noted that the skid detector arrangements described in the preceding application consists of acceleration responsive devices which respond to an excessive deceleration and act on servo-motors which automatically cut out the hydraulic brake pressure before the wheel is locked, afterwards restoring this pressure when the wheel has regained a certain angular speed.

In one particular form of construction the detector device or acceleration responsive device according to the present invention has been designed in a very compact form which enables it to be housed in the journal of the wheel axle and so to be protected from everything which might disturb its functioning.

In his copending patent application, the applicant described a brake controller which, like those abovementioned, relies on inertia, but is distinguished in that the effects of inertia, instead of acting mechanically to close or open the electric circuits, themselves generate an electric current which, through the appropriate intermediaries, governs the releasing of the brake on the wheel.

The arrangement according to the invention resembles the first arrangements recalled above in that it acts, like them, by mechanical means to close or open electric circuits on an independent current supply, but it has analogies in design to the last arrangement mentioned although it lacks the means provided in the latter for generating of itself the electric current governing the releasing of the brake.

It is distinguished from both types by a greater simplicity in design both from the mechanical point of view and from the point of view of the governing electric circuits, as will be seen from the following description of one form of construction given by way of example and illustrated by the attached drawing.

In this drawing, Figure 1 shows a longitudinal section through the apparatus;

Figures 2 and 3 show sections upon the lines a—a and b—b respectively of Figure 1;

Figure 4 shows a diagram of the electric circuit governing the braking and brake releasing.

The arrangement comprises a cylindrical housing 1, having a central axis x—x, which is clamped into the journal F of the aircraft wheel R. In this housing is housed a piece of insulating material 2 terminated on the inside by a cylindrical seating 3 on which is mounted a ball bearing 4 centered on the axis x—x. The other end of the housing carries a second ball bearing 5, centered on this same axis x—x. Between these two bearings a case 6 can turn about the axis x—x. This case carries at one end a plate 7 which is mounted outside the bearing 4 and a member 8 which is mounted inside the bearing 5. The member 8 is fixed to rotate with the wheel R by means of a pin 9 engaging in two longitudinal slots 10 and a cylindrical cup situated in the centre of a plate 11 fixed by screws to the wheel R. A head 9' on the pin, engaged inside the cup prevents the disengagement of the latter until the plate 11 has been moved clear of the wheel R. The case 6 is therefore fixed with the wheel R and turns with it.

Inside the case 6 is mounted the acceleration responsive device constituted as follows: a fly-wheel 12 pivots freely about the axis x—x in two ball bearings 13, 14, mounted respectively in the plate 7 and in the member 8. This fly-wheel is connected to the case 6 by a coil spring 15. At one point on its periphery it carries a pawl 16 which can move in a slot 17 in the case 6 made perpendicular to the axle, and extending through, a sector of 90° for example. The spring 15 is coiled in such a way that it tends to keep the pawl 16 pressed against the case 6 at one end of the slot and becomes taut when the pawl 16 is displaced towards the other end of the slot. The plate 7 is made of insulating material. On its outside face it has two circular conductor rings 18, 19 one of which 18 is connected electrically to the metallic frame of the case 6 by a ring 20, while the other 19 is connected to a conductor plate 21 embedded in the plate 7 with which it is flush. The circular ring 19 is connected to a terminal pin 22 by a carbon brush 23 on which rests a leaf of a spring 24. The circular ring 18 is connected in the same way to a second terminal pin which is not shown. The two pins are housed in an extension 25 of the casing which serves as a socket for a plug coupling which is not shown but which is connected in to the electric current circuit governing the brake valve. A sliding contact 26 pressed by a spring 27 fixed at one end to the fly-wheel 12 at 28, rubs against the plate 7 or against the plate 21 according to the respective positions of the case 6 and the fly-wheel 12. The other end of the spring 27 is engaged in a nick 29 made in the fly-wheel 12 which prevents it from turning about the fixture point 28.

The arrangement functions as follows:

The wheel turns in the direction of the arrow G of Figure 3.

Let C be the return torque of the coiled spring 15, $i$ the moment of inertia of the fly-wheel 12. As long as the deceleration caused by the braking of the wheel and consequently that of the case 6 is below a certain limit, as a function of the calibration of the spring 15, the fly-wheel accompanies the case in its rotational movement and the sliding contact 26 does not leave the insulating part of the plate 7. But when the deceleration exceeds the value $$\frac{C}{i}$$

the fly-wheel, because of its inertia, revolves more quickly than the braked wheel, the spring becomes taut and at a given moment the sliding contact 26 meets the plate 21 and closes the electric circuit ending in the pins 22 which governs the brake valve. The braking liquid under pressure is emptied into the exhaust tank, the pressure falls and the brake is released; the wheel then accelerates again, the spring 27 returns the flywheel into its synchronous position, the contact 26 leaves the plate 21, the current is cut and the brake acts again.

The diagram of the electric circuit governed by the acceleration responsive device of the invention is represented by the figure 4.

The terminals 22 are connected to a supply of electric current at A and to the frame at B. When the sliding contact 26 comes into contact with the plate 21 the circuit ACDFB is closed, the electro-magnet $E_1$ is excited and closes the switch I. The coil E₂ then becomes live and actuates the electro-magnetic distributor which releases the brake valve. On the other hand, it is closed as soon as the sliding contact 26 leaves the plate 21.

I claim:

A self-regulating device for a pressure control means which is controllably responsive to a source of electrical power and which controls the braking of a wheel rotatable about an axis comprising a housing affixed inside the wheel, a case inside said housing and affixed to the wheel for rotating with the wheel about the axis, a fly wheel centered on the axis inside said case and capable of restricted motion about the axis with respect to said case, an electrically conductive spring positioned in said case and contacting said case and fly wheel for urging said fly wheel into a normal position relative to said case, an insulating end plate on said case and adjacent to said fly wheel, a conductive plate in said insulating end plate and covering a portion thereof, a sliding contact on said fly wheel normally contacting said insulating end plate; said case, spring, fly wheel, sliding contact and conductive plate constituting a portion of an electrical circuit wherein said sliding contact is the movable contact of a switch; and terminals coupling said case and conductive plate to the source of power, said sliding contact being responsive to the removal of said fly wheel from its normal position with respect to said case for contacting said conductive plate and causing power to be supplied to the pressure control means, said fly wheel moving from its normal position by reason of its inertia in accordance with a change of speed of rotation of the wheel.

References Cited in the file of this patent

UNITED STATES PATENTS

| | | |
|---|---|---|
| 1,311,135 | Olds | July 22, 1919 |
| 2,069,272 | Richards | Feb. 2, 1937 |
| 2,186,765 | Metcalf | Jan. 9, 1940 |
| 2,225,978 | Carmichael | Dec. 24, 1940 |
| 2,393,031 | Eksergian | Jan. 15, 1946 |
| 2,412,513 | Jones et al. | Dec. 10, 1946 |
| 2,573,387 | Bush | Oct. 10, 1951 |
| 2,636,700 | Yarber et al. | Apr. 28, 1953 |